United States Patent [19]
Zimmerman et al.

[11] Patent Number: 6,067,578
[45] Date of Patent: May 23, 2000

[54] CONTAINER INDEPENDENT CONTROL ARCHITECTURE

[75] Inventors: Christopher A. Zimmerman, Bellevue; Christopher L. Fraley, Woodinville, both of Wash.

[73] Assignee: Microsoft Corporation, Redmond, Wash.

[*] Notice: This patent is subject to a terminal disclaimer.

[21] Appl. No.: 09/258,044

[22] Filed: Feb. 23, 1999

Related U.S. Application Data

[63] Continuation of application No. 08/971,461, Nov. 17, 1997, Pat. No. 5,911,068, which is a continuation of application No. 08/415,532, Mar. 30, 1995, abandoned.

[51] Int. Cl.[7] .................................................. G06F 9/46
[52] U.S. Cl. ............................................. 709/315; 709/313
[58] Field of Search .................................... 709/302, 303, 709/313, 315; 345/335, 339, 348

[56] References Cited

U.S. PATENT DOCUMENTS

| | | | |
|---|---|---|---|
| 5,121,478 | 6/1992 | Rao ........................................ | 395/157 |
| 5,237,654 | 8/1993 | Shackelford et al. .................. | 395/160 |
| 5,446,902 | 8/1995 | Islam ..................................... | 395/700 |
| 5,485,617 | 1/1996 | Stutz et al. ............................. | 395/700 |
| 5,515,536 | 5/1996 | Corbett et al. ......................... | 395/700 |
| 5,519,845 | 5/1996 | Birch et al. ............................ | 395/445 |
| 5,911,068 | 6/1999 | Zimmerman et al. .................. | 709/302 |

OTHER PUBLICATIONS

Brockschmidt, Kraig, "OLE Integration Technologies: A Technical Overview," *OLE Articles*, Microsoft Corporation, 1992–1996, pp. 1–19.

Lam, Beatrice et al., "The New Wave Office," Hewlett–Packard Journal, vol. 40, No. 4, Aug., 1989, p. 23(9).

Shammas, Namir Clement, *Advanced C++*, Sams Publishing, Carmel, IN, 1992, pp. 173–237.

*Primary Examiner*—John Follansbee
*Attorney, Agent, or Firm*—Klarquist Sparkman Campbell Leigh & Whinston, LLP

[57] ABSTRACT

The present invention provides a control architecture that enables the sharing of controls between many containers. That is, the present invention provides for developing a control in such a manner that it may be used on dissimilar containers without modification. Thus, the control architecture of the present invention is a container independent control architecture that allows for the sharing of code. Since the container independent control architecture of the present invention provides for code sharing, the time required for developing controls and containers is reduced by the present invention. The present invention is utilized by splitting the functionality performed by a control into container dependent functionality and container independent functionality. After splitting the functionality, the present invention embodies the container independent functionality into a control and the container dependent functionality into an extended control. The present invention then combines the extended control and the control so as to appear as a single entity to the container.

18 Claims, 11 Drawing Sheets

CONTAINER INDEPENDENT CONTROL ARCHITECTURE

CROSS-REFERENCE TO RELATED APPLICATIONS

This application is a continuation of U.S. patent application Ser. No. 08/971,461 filed Nov. 17, 1997 now U.S. Pat. No. 5,911,068; which application is a continuation of U.S. patent application Ser. No. 08/415,532, filed Mar. 30, 1995 now abandoned.

FIELD OF THE INVENTION

The present invention relates generally to data processing systems and, more particularly, to a control architecture that is container independent.

BACKGROUND OF THE INVENTION

Following is an overview of object-oriented techniques that, in some cases, is specific to the C++ programming language. Two common characteristics of object-oriented programming languages are support for data encapsulation and data type inheritance. Data encapsulation refers to associating functions with data. Inheritance refers to the ability to declare a data type in terms of other data types. Thus, inheritance provides for a hierarchy of classes where the classes that are defined lower in the hierarchy share the structure or behavior of the classes that are higher in the hierarchy. In the C++ programming language, data encapsulation and inheritance are supported through the use of classes. A class is a defined type. A class declaration describes the data members and function members of the class. A function member is also referred to as a method of a class. The data members and function members of a class are bound together in that the function members operate on a particular instance of the data members of the class. An instance of a class is also called an object of the class. Thus, a class provides a definition for a group of objects with similar properties and common behavior.

To allocate storage for an object of a particular type (class), an object is instantiated. The term "instantiating" refers to providing code for member functions and data to data members. Once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics or another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual allows the function to be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before an object of that class can be instantiated. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members ("methods") and data members ("properties"). In C++, an interface is implemented as an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program would need to determine at runtime whether a particular object supports a particular interface. To enable this determination, every object supports the interface IUnknown, which contains a function member, QueryInterface, that indicates which interfaces are implemented for the object. The method QueryInterface is defined as follows:

virtual HRESULT QueryInterface (REFIID iid, void**ppv)=0;

The method QueryInterface is passed an interface identifier in parameter iid (of type REFIID) and returns in parameter ppv a pointer to the implementation of the identified interface of the object for which the method is invoked. If the object does not support the interface, then the method returns a predefined status value of E_NOINTERFACE. The type HRESULT indicates a predefined status.

FIG. 2 is a symbolic representation of an object. In the following description, an object data structure is represented by the shape 201 labeled with the interfaces through which the object may be accessed. These interfaces include the IUnknown interface, the IDatabase interface, and the IBasic interface.

One type of object is known as a control. A "control" is a screen oriented object that displays information to a user and accepts input from the user. Thus, the definition of a control encompasses an edit box, as well as a pushbutton on a computer display. Controls are typically stored in a container. A "container" is responsible for storing controls, as well as presenting the controls to a user via the computer display. Thus, a container is usually an application program such as the Microsoft Word word processing program, the Excel spreadsheet program, or the Visual Basic Development Environment, which are all available from Microsoft Corporation of Redmond, Wash.

SUMMARY OF THE INVENTION

The present invention provides a control architecture that enables the sharing of controls between many containers. That is, the present invention provides for developing a control in such a manner that it may be used on dissimilar containers without modification. Thus, the control architecture of the present invention is a container independent control architecture that allows for the sharing of code. Since the container independent control architecture of the present invention provides for code sharing, the time required for developing controls and containers is reduced by the present invention.

The present invention is utilized by splitting the functionality performed by a control into container dependent functionality and container independent functionality. After splitting the functionality, the present invention embodies the container independent functionality into a control and the container dependent functionality into an extended control. The present invention then combines the extended control and the control so as to appear as a single entity.

In accordance with a first aspect of the present invention, a method is provided in a computer system having a computer display and a container for storing and presenting controls. The method of the first aspect of the present invention provides for providing a control having container independent functionality, providing an extended control having container dependent functionality, and presenting the control and the extended control as one entity to the container.

In accordance with a second aspect of the present invention, a data processing system is provided. The data processing system of the second aspect of the present invention comprises an aggregate control for displaying information on a computer display and for accepting user input. The aggregate control further comprises a control for providing container independent functionality and an extended control for providing container dependent functionality. Further, the data processing system includes a container for storing and presenting the aggregate control to a user.

DETAILED DESCRIPTION OF THE INVENTION

The preferred embodiment of the present invention provides a control architecture that enables the sharing of controls between many containers. That is, the preferred embodiment provides for developing a control in such a manner that it may be used on dissimilar containers without modification. Thus, the control architecture of the preferred embodiment is a container independent control architecture that allows for the sharing of code. Since the container independent control architecture of the preferred embodiment of the present invention ("the preferred architecture") provides for code sharing, the time required for developing controls is reduced.

The preferred architecture is implemented by splitting the functionality performed by a control into container dependent functionality and container independent functionality. For example, since a pushbutton can always be pushed by the user and will always display a caption indicating the function of the pushbutton, both the invocation of the pushbutton and the caption are considered to be container independent functionality. That is, this functionality will be performed in the same way regardless of the type of container on which the control appears. On the other hand, representing the position of a control within a container typically depends on the type of the container and not the type of the control, and is therefore considered to be container dependent functionality. For example, a container that is a word processor may represent the position of a control as an offset within the characters of a document, whereas another type of container may represent the position of the control as a pair of Cartesian coordinates.

After splitting the functionality into container independent functionality and container dependent functionality, the preferred architecture embodies the container independent functionality into a control and the container dependent functionality into an extended control. An "extended control" is an object that is further described below. The preferred architecture then combines the extended control and the control so as to appear as a single entity. Therefore, from an outside view, the distinction between the extended control and the control is removed. By separating the functionality in this manner, a control implemented for one container may be used in many other containers, thereby lessening the development time of controls, as well as containers.

The preferred architecture was developed to operate in an object oriented environment, such as an environment that supports the Microsoft OLE 2.01 ("OLE") protocol established by Microsoft Corporation of Redmond, Wash. Although the preferred embodiment is described as being utilized within the OLE environment, one skilled in the art will appreciate that the present invention can be used in other environments.

Figure 1:
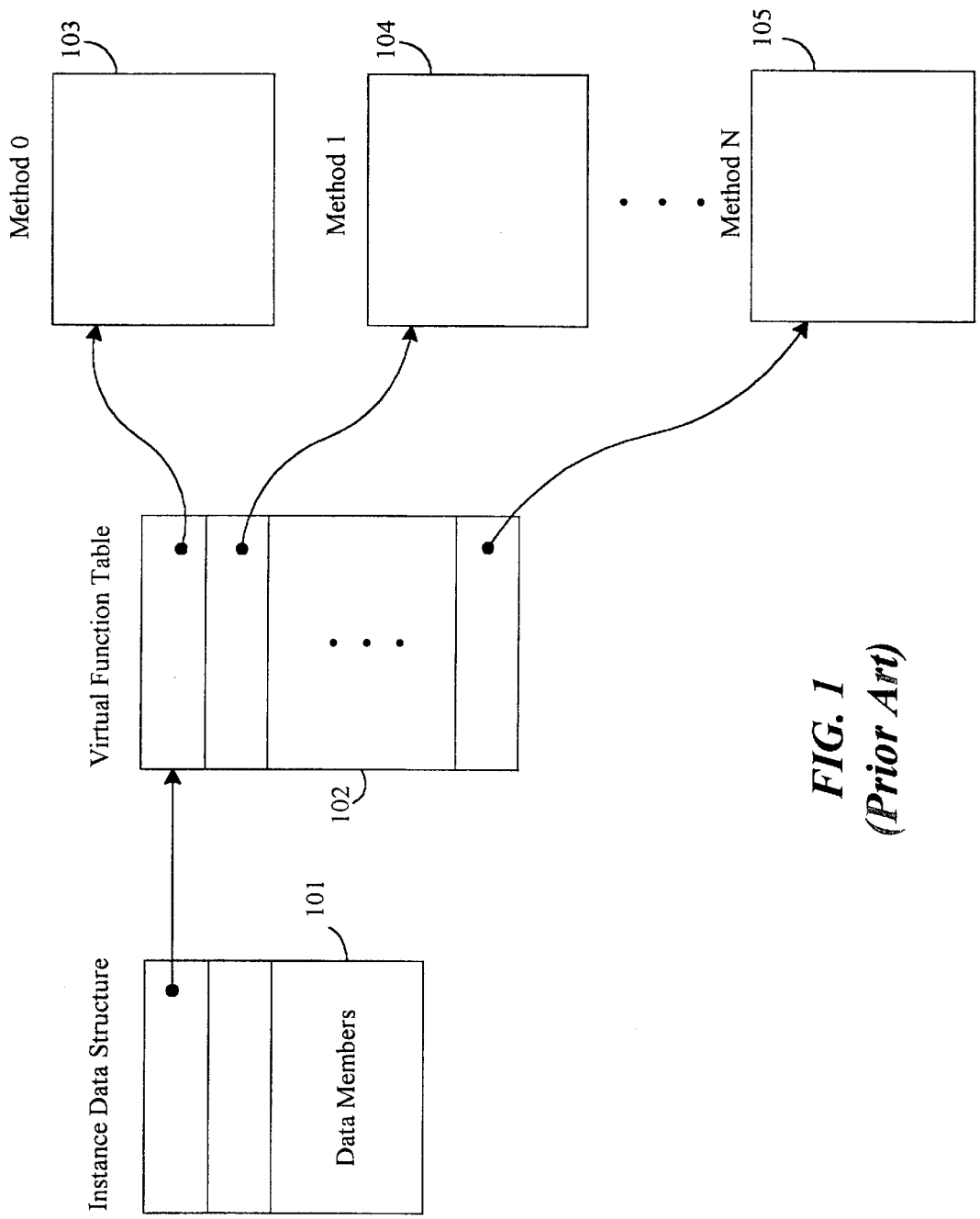
FIG. 1 is a block diagram illustrating conventional data structures used represent an object.
Figure 2:
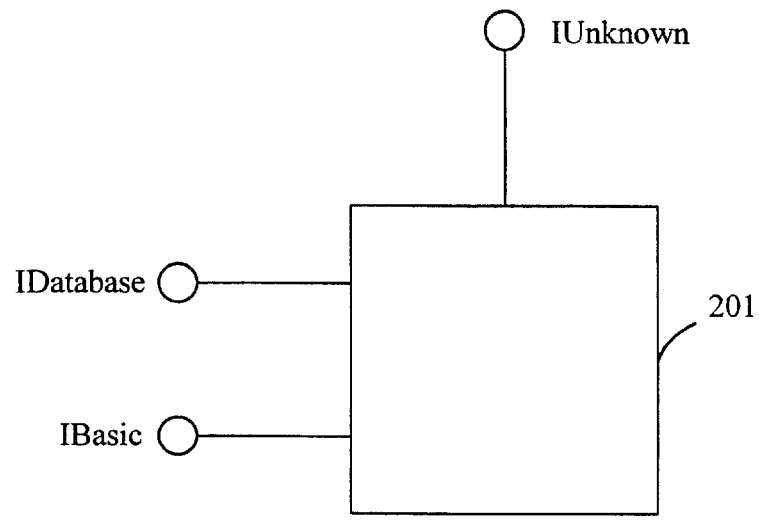
FIG. 2 is a conventional symbolic representation of an object.
Figure 3:
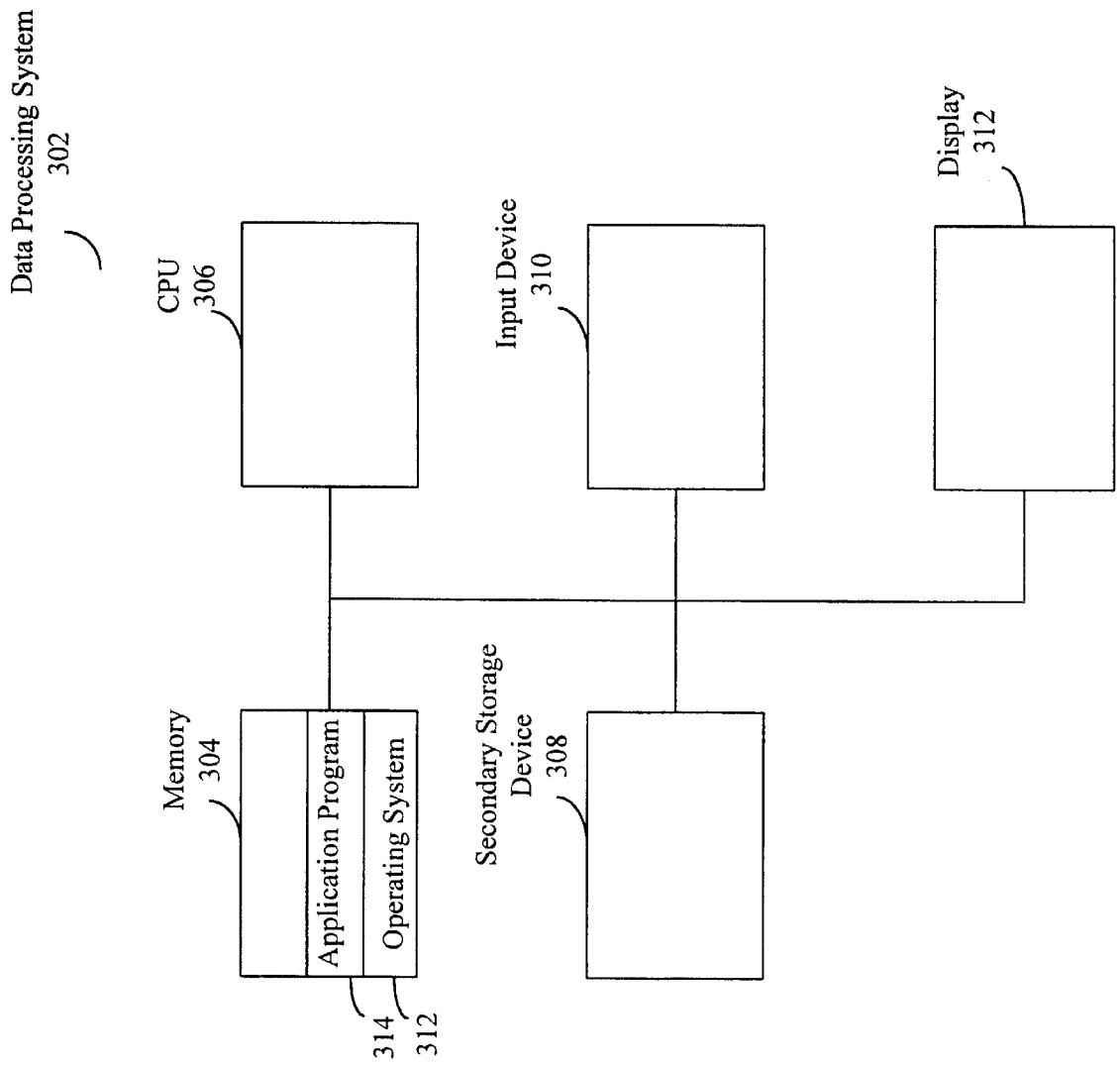
FIG. 3 is a block diagram of a data processing system suitable for practicing the preferred embodiment of the present invention.

FIG. 3 depicts a data processing system 302 that is suitable for practicing the preferred embodiment of the present invention. The data processing system 302 contains a memory 304; a central processing unit (CPU) 306; a secondary storage device 308, such as a hard disk drive; an input device 310, such as a keyboard; and a display 312. The memory 304 holds a copy of an operating system 312, such as the "MICROSOFT WINDOWS" operating system sold by Microsoft Corporation of Redmond, Wash., and a copy of an application program 314. Although the preferred architecture will be described below with reference to an application program, one skilled in the art will appreciate that the preferred architecture can be utilized by an operating system.

Figure 4:
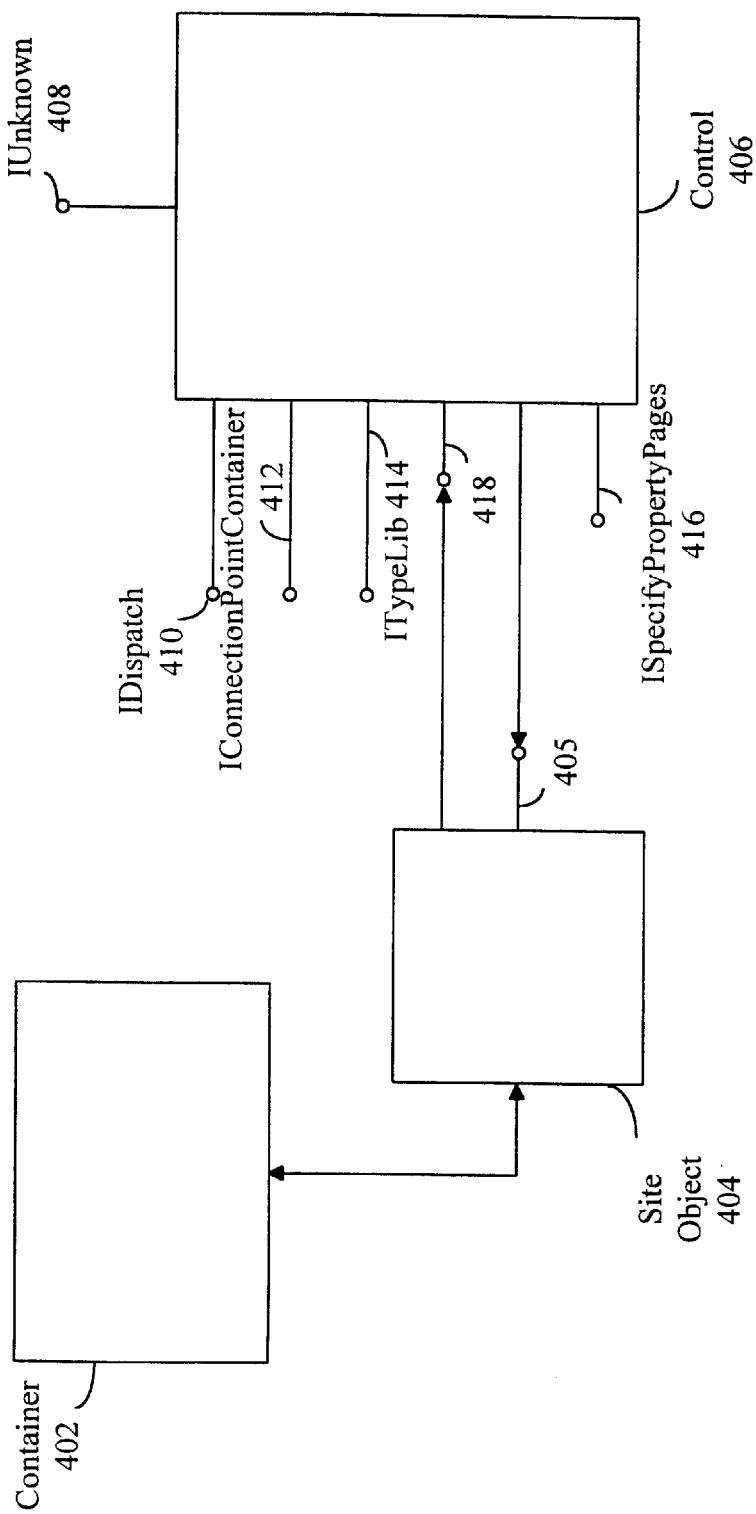
FIG. 4 depicts a block diagram of a conventional control architecture.

In order to more fully appreciate the benefits of the preferred architecture, it is helpful to describe a conventional control architecture. The conventional control architecture, as shown in FIG. 4, contains a container 402, a site object 404, and a control 406. The site object 404 acts as an interfacing mechanism between the container 402 and the control 406. The site object 404 is considered to be part of the container 402. The site object 404 provides an interface 405 that allows access to the methods and properties of the container. Thus, the site object 404 provides a view of the capabilities of the container to the control 406. The control 406 contains both container dependent and container independent functionality. In computer systems which utilize the "MICROSOFT WINDOWS" operating system, a control is typically implemented as a window. The control 406 provides an interface 418 that enables the site object 404 to access the methods and properties of the control. In addition, the control 406 provides a number of interfaces that may be used by other objects, controls or containers. These interfaces include the IUnknown interface 408, the IDispatch interface 410, the IConnectionPointContainer interface 412, the ITypeLib interface 414, and the ISpecifyPropertyPages interface 416. These interfaces will be discussed in greater detail below. Since the control 406 contains both container dependent and container independent functionality, the control of the conventional control architecture is not easily portable. That is, the implementation of the control is specific to one container and significant modifications would be necessary to place the control into another type of container.

By the site object acting as the interfacing mechanism between a control and a container, the container is able to determine which control is invoking a method of the container. For example, if the container allowed direct access from the control to the methods of the container, the container would typically be unable to ascertain which control was invoking the method. This information is important in certain situations such as if the control requested the container to place the control within view, the container would need to know which control to make visible. By utilizing one site object per control, the container implicitly knows the source of a method invocation by knowing which site object the invocation came through.

As previously stated, the site object provides an interface so that the control can access the methods and properties of the container and the control provides an interface so that the container can access the methods and properties of the control.

Together, these two interfaces facilitate container-control communication. The communication between the container and the control depends upon the functionality of the container, as well as the functionality of the control. Examples of properties that the control may choose to expose to the container include the "background color" property that specifies the color for the interior of the control, the "border style" property that determines whether a control is displayed with a border, the "forecolor" property that specifies the color for the display of text and graphics in a control, and the "enabled" property that indicates whether the control can receive the focus. The "focus" refers to the control being activated. Examples of methods that the control may choose to expose to the container include the "Refresh" method which forces a repaint of the control, the "DoClick" method which simulates a button on a mouse input device ("Mouse button") being clicked by the user, and the "AboutBox" method which pops up a dialog box that provides information about the control.

One type of property that the container may expose to the control is the ambient set of properties, which include information as to how to set a default value for the properties of the control. For example, such properties may include a "background color" property that specifies the color for the interior of a control, the "display name" property that specifies the name the control should display for itself, the "font" property that specifies font information for the control, the "forecolor" property that specifies the color for the display of text and graphics in a control, and the "text align" property that specifies how the text should be aligned in a control. An example of text alignment is to left justify the text. One example of a method that may be exposed by the container is the "ShowObject" method which scrolls a control that had been previously out of the view of the user to within the view of the user. Although specific properties and methods have been described relative to both the control and the container, one skilled in the art will appreciate that additional or different properties and methods can be utilized by both the container and the control.

In addition to the interface that provides direct access to the container, the control provides a number of other interfaces including: the IUnknown interface, the IDispatch interface, the IConnectionPointContainer interface, the ITypeLib interface, and the ISpecifyPropertyPages interface. The IUnknown interface has previously been described. The IDispatch interface provides a uniform mechanism for accessing the properties and invoking the methods of the control without the container having to know the signatures of the methods at compile time. The IDispatch interface is more clearly described in U.S. Pat. No. 5,515,536 entitled "Method and System for Invoking Methods of an Object," which is hereby incorporated by reference.

The IConnectionPointContainer interface provides access to the events of the control so that another entity ("sink") can register for and receive events generated by the control. The types of events that may be generated by the control include the "click" event which occurs when the user presses and then releases a mouse button over the control, the "double click" event which occurs when the user double clicks a mouse button on the control, the "key down" event which occurs when users press a key on a keyboard when the control has the focus, the "key up" event which occurs when the user releases a key when the control has the focus, the "mouse down" event which occurs when the user depresses a mouse button while over the control, the "mouse move" event which occurs when an indicator reflecting mouse movement moves over the control, and the "mouse up" event which indicates that the user has released the mouse button over the control. The IConnectionPointContainer interface and, more generally, event processing, are more clearly described in U.S. Pat. No. 5,486,617 entitled "Method and System for Dynamically Generating Object Connections," which is hereby incorporated by reference.

The ITypeLib interface provides access to a type library maintained by the control. A "type library" contains information that defines a type of objects, such as binding information for binding data to function members of an object, loading information for determining the address of functions and variables, and type information for describing the types defined in the library. The ITypeLib interface and, more generally, the type library are more completely described in U.S. patent application Ser. No. 07/959,056, entitled "Method and System for Interfacing to a Type Library," which is hereby incorporated by reference. In addition, the type library can be used by controls for data binding. The term "data binding" refers to creating a logical link between a mechanism that utilizes data, such as a control, and a data source that contains the data. Data binding with controls is more clearly described in U.S. Pat. No. 5,706,505 entitled "Method and System for Binding Data in a Computer System," which is hereby incorporated by reference.

The ISpecifyPropertyPages interface provides access to the property pages of a control. A "property page" is a grouping of properties of a control. By retrieving the property pages of a control, the container can browse the property pages and access the properties associated with the control. The ISpecifyPropertyPages interface and, more generally, the accessing and browsing of property pages are more clearly described in co-pending U.S. Pat. No. 5,682,510, entitled "Method and System for Adding Application Defined Properties and Application Defined Property Sheet Pages," which is hereby incorporated by reference.

As shown in FIG. 4, the control of the conventional control architecture is a single entity that contains both container independent functionality, as well as container dependent functionality. Therefore, using the conventional control architecture, if a developer developed a pushbutton control for a word processor, the developer would not be able to easily use that same control for a spreadsheet program. In order to use the control in the spreadsheet program, the developer would have to modify the code of the control and debug and test the control in the new environment. This can require a significant amount of development time. On the other hand, the preferred architecture splits the functionality of the control into two parts: container dependent functionality that is provided by an extended control and container independent functionality that is provided by a control. Thus, by using the preferred architecture, the control can be easily relocated from one container to another container; all that the developer needs to do is to implement the extended control. This reduces development time and facilitates the development of both controls and containers. In addition, a developer can use any control with little effort as long as the control adheres to the preferred architecture.

Figure 5:
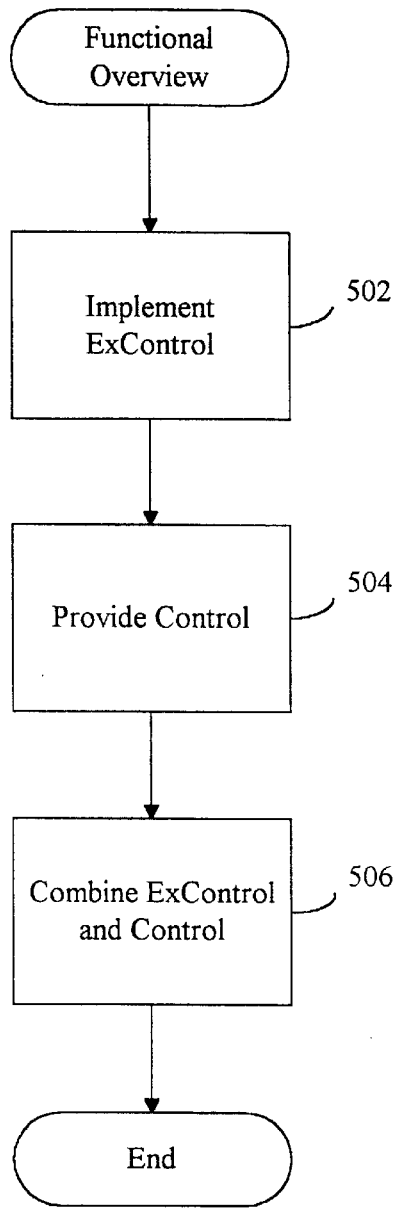
FIG. 5 is a flowchart depicting a functional overview of the steps performed by the preferred embodiment of the present invention.

FIG. 5 depicts a flowchart of a functional overview of utilizing the preferred architecture of the present invention to develop a control. The first step performed in utilizing the preferred architecture is to implement the extended control (step 502). In this step, the developer provides container dependent methods, events, and properties in an extended control. This step is described in further detail below. After implementing the extended control, the developer provides a control (step 504). In this step, the developer has the option of developing their own control with container independent functionality or the developer can utilize a pre-implemented control that was developed by another developer. As long as the control was developed to fit within the OLE controls architecture, as described herein, the control can be utilized in a variety of containers. After providing the control, the developer combines the extended control and the control to appear as one entity (step 506). In this step, the developer combines the extended control with the control in such a manner that the extended control acts as the main entry point for requests. The preferred architecture provides this combination by aggregating the extended control and the control to create an aggregate object. The aggregation of objects is more clearly described in U.S. Pat. No. 5,805,885, entitled "Method and System for Aggregating Objects," which is hereby incorporated by reference. After combining the extended control and the control, the developer can then utilize the aggregate object in the container.

Figure 6:
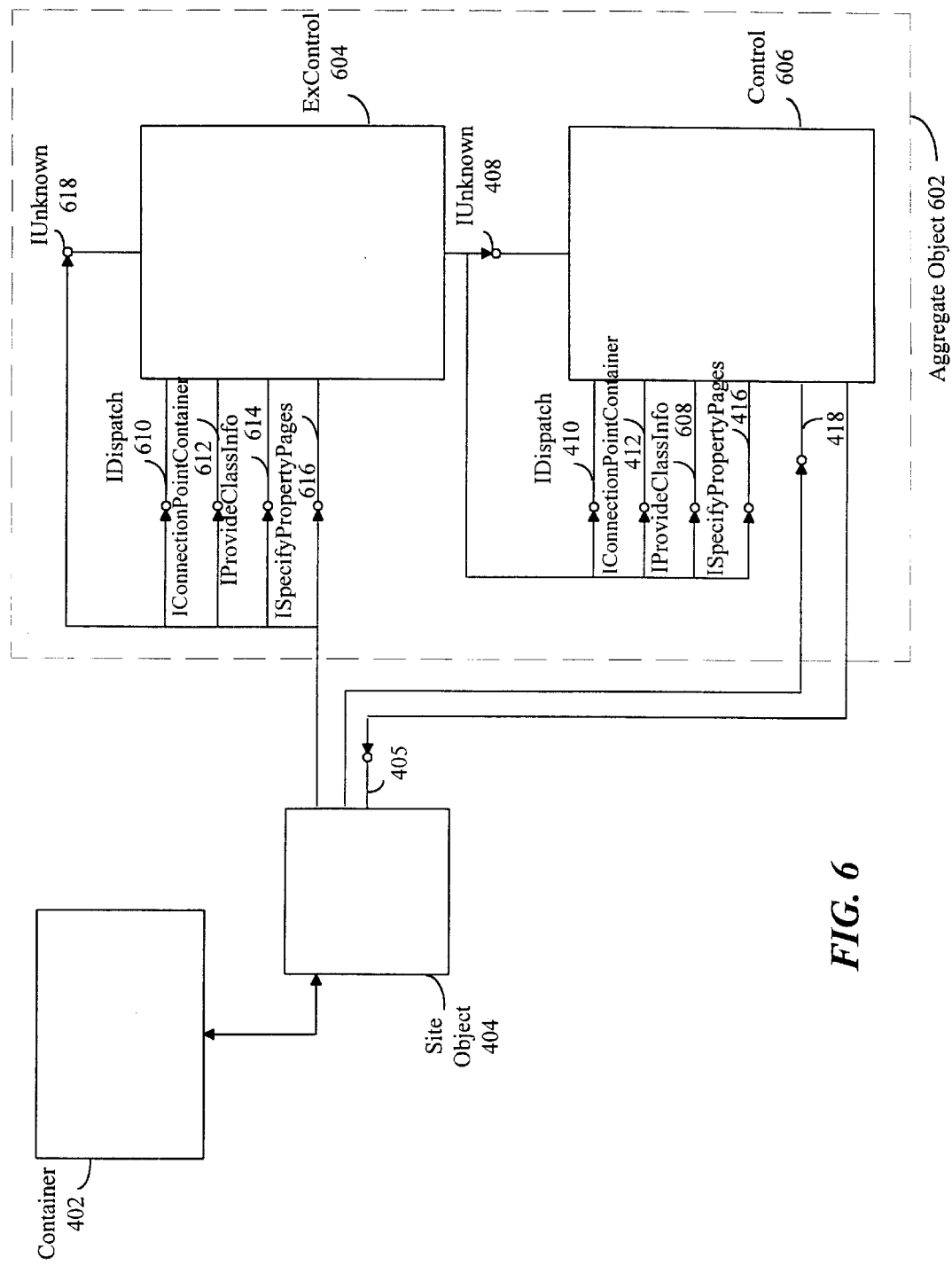
FIG. 6 depicts a block diagram of the container independent control architecture of the preferred embodiment of the present invention.

FIG. 6 depicts a block diagram of the preferred architecture of the present invention. In the preferred architecture, a container 402 interfaces with a site object 404 and the site object interfaces with an aggregate object 602. The aggregate object 602 contains an extended control 604 and a control 606. The site object 404 and the control 606 can communicate directly through interfaces 405 and 418. However, the site object 404 may also communicate by utilizing certain interfaces on the extended control 604 which, in turn, may invoke the interfaces on the control 606.

These interfaces on the extended control 604 include an IUnknown interface 618, an IDispatch interface 610, an IConnectionPointContainer interface 612, an IProvideClassInfo interface 614, and an ISpecifyPropertyPages interface 616. Each of these interfaces will be discussed in more detail below. The control 606 provides a number of interfaces including: an IUnknown interface 408, an IDispatch interface 410, an IConnectionPointContainer interface 412, an IProvideClassInfo interface 608, and an ISpecifyPropertyPages interface 416. In the control 606 of the preferred architecture, the exposed interfaces are similar to those of the conventional control architecture with the exception that the IProvideClassInfo interface 608 provides access to the type library of the control. As will be discussed in further detail below, the interfaces of the extended control 604 are implemented such that incoming requests for information are handled by the extended control when applicable and when the extended control cannot handle such a request, the request is passed on (i.e., delegated) to the control 606 for processing. Therefore, in this respect, the extended control 604 acts as a filtering mechanism for deciding when to invoke the methods (or access the properties) of the control 606 and when to handle a request locally. Therefore, the extended control 604 can be thought of as a shell surrounding the control 606, which is visible to the site object 404.

In order to utilize the preferred architecture of the present invention and, thus, take advantage of the benefits of the preferred architecture, a developer must perform certain actions. The developer first implements a container to perform specific functionality, such as that of a word processor. The developer then determines how many controls will be needed within the container and develops a site object and uses an instance of the site object for each control. After developing the site object, the developer creates an extended control for each control containing container dependent functionality. The developer can then choose to either implement a control or use a preimplemented control, which contains container independent functionality. Next, the developer aggregates the control with the extended control. After aggregating the extended control with the control, the developer can then take advantage of the preferred architecture of the present invention.

In order to more fully appreciate the implementation of an extended control, each of the major areas of functionality of an extended control is described below by presenting the major interfaces of an extended control. It should be appreciated that each description of an interface is merely illustrative of an implementation that would work within the preferred architecture of the present invention. Thus, one skilled in the art will recognize that there are other implementations that would also work within the preferred architecture of the present invention. As previously stated, in order to provide access to the type library, the extended control implements the IProvideClassInfo interface. In addition, however, the extended control also provides an implementation of the ITypeInfo interface and the ITypeMembers interface. The IProvideClassInfo interface contains one method, the GetClassInfo method, which, when invoked, returns a pointer to the ITypeInfo interface. The IProvideClassInfo interface is defined in Code Table Number 1.

---

Code Table Number 1 interface IProvideClassInfo : public IUnknown
{
    GetClassInfo(ITypeInfo ** ppTI);
};

---

The ITypeInfo interface and the ITypeMembers interface are defined in U.S. patent application Ser. No. 07/959,056, entitled "Method and System for Interfacing to a Type Library," which has previously been incorporated by reference.

Figure 7:
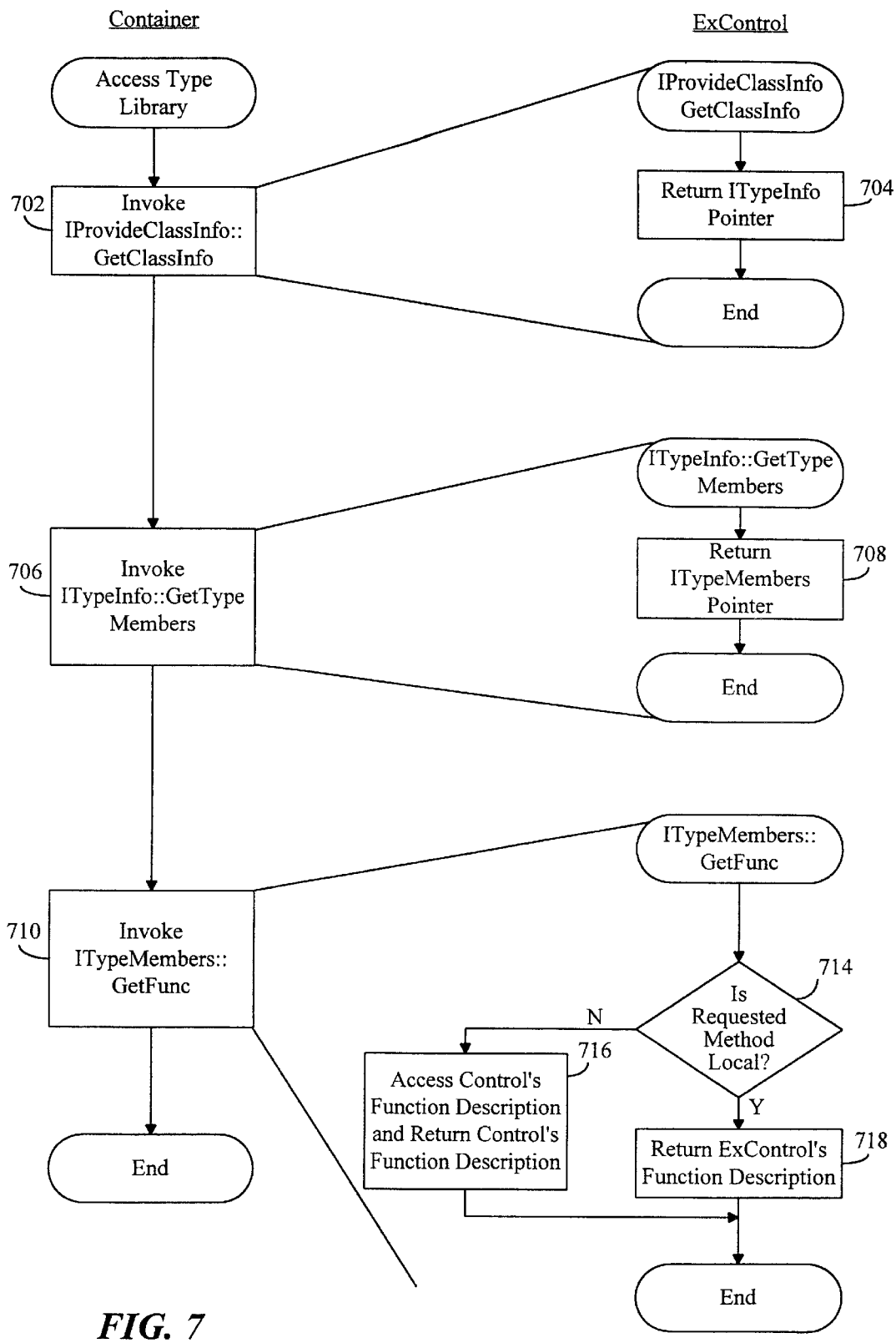
FIG. 7 depicts a flowchart of the steps performed by the preferred embodiment of the present invention when accessing a type library.

FIG. 7 depicts a flowchart of the steps performed by the preferred embodiment when accessing the type library. The steps provided herein describe retrieving the appropriate interfaces so that the container can access the type library, as well as an example implementation of a method that would return information from the type library. In order to obtain access to the type library, the container invokes the GetClassInfo method of the IProvideClassInfo interface (step 702). The invocation of this method causes the extended control to return a pointer to the ITypeInfo interface (step 704). The container then invokes the GetTypeMembers method of the ITypeInfo interface (step 706). The invocation of this method causes the extended control to return a pointer to the ITypeMembers interface (step 708). After retrieving the pointer to the ITypeMembers interface, the container can invoke any of the various methods contained therein. Each of the methods, when invoked, provides various information pertaining to both the extended control and the control. In this example, the container invokes the GetFunc method of the ITypeMembers interface, which returns a description of a particular method (step 710).

Upon invocation of the GetFunc method, the extended control determines if the requested method is local (step 714). The extended control has direct access to all of its methods and thus simply checks local storage to determine if it has such a method. If the requested method is local, the extended control returns the description of the method (step 718). However, if the requested method is not local, the extended control accesses the method description of the control and then returns the method description of the control (step 716). In this step, the extended control invokes the GetClassInfo method of the IProvideClassInfo interface of the control, invokes the GetTypeMembers method of the ITypeInfo interface, invokes the GetFunc method of the ITypeMembers interface, and then returns the results of the invocation of the GetFunc method to the container. By the extended control utilizing the type libraries of the extended control and the control in this manner, the extended control effectively merges both the type library for the extended control and the type library for the control together. That is, when the container receives a pointer to the ITypeMember interface, the invocation of any of the methods therein will first check the type library of the extended control and then, if the requested information is not found, the method will check the type library of the control. Therefore, the type libraries appear to the container to have been merged. Although a description of the GetFunc method on the ITypeMember interface has been provided, one skilled in the art will appreciate that all of the information provided by a type library through any of the type library interfaces can be provided in a similar manner by the preferred architecture of the present invention.

Figure 8:
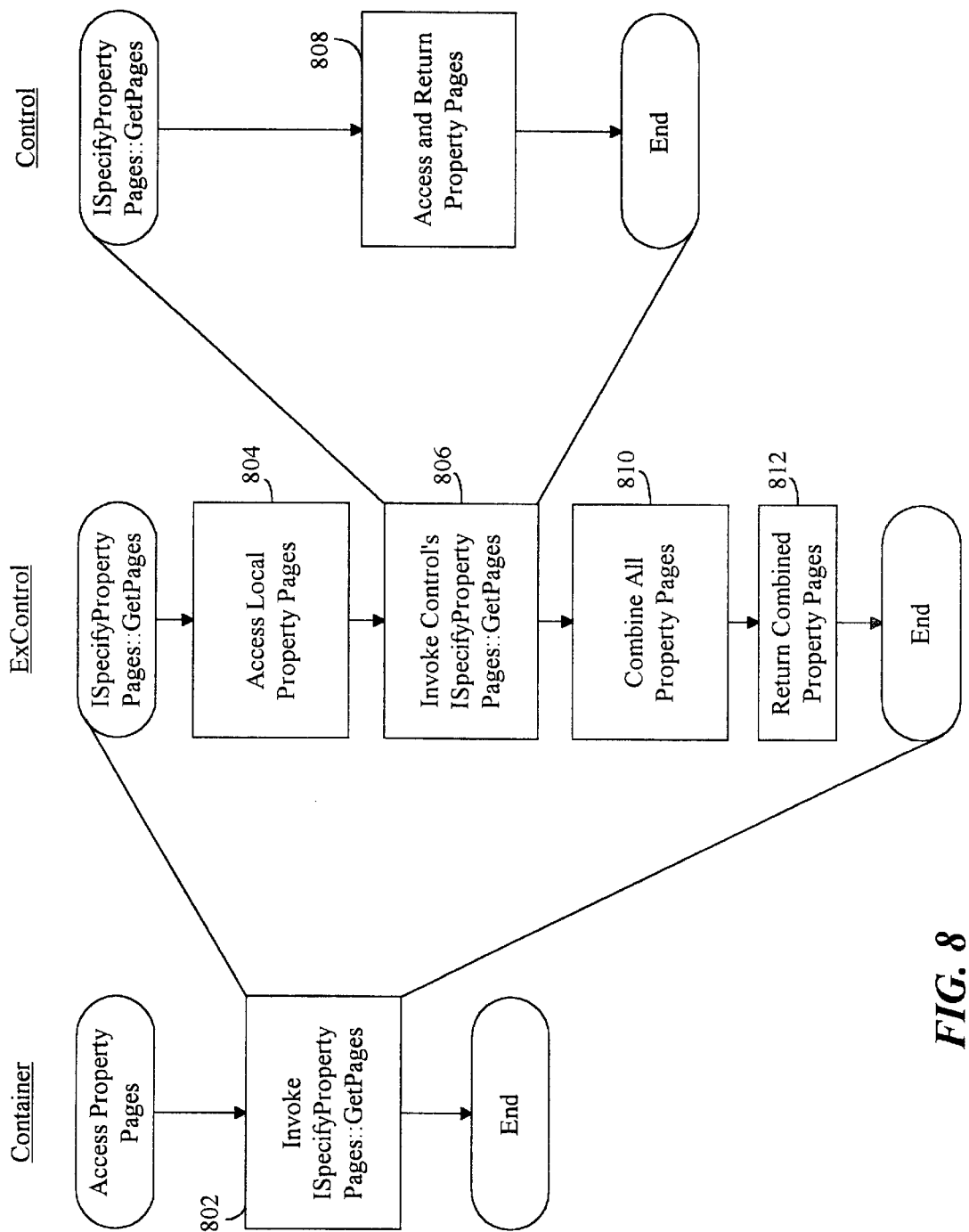
FIG. 8 depicts a flowchart of the steps performed by the preferred embodiment of the present invention when accessing property pages.

FIG. 8 depicts the processing performed by the preferred embodiment when accessing property pages. In the preferred architecture of the present invention, the container accesses the property pages of both the extended control and the control by invoking the GetPages method of the ISpecifyPropertyPages interface of the extended control (step 802). Upon invoking the GetPages method, the extended control accesses its local property pages (step 804). The property pages of the extended control are stored locally and, as such, the extended control has direct access to them. After accessing the local property pages, the extended control invokes the GetPages method of the ISpecifyPropertyPages interface of the control (step 806). Upon invoking this method, the control accesses and returns the property pages of the control to the extended control (step 808). Next, the extended control combines all of the property pages into a list or combined set of property pages (step 810). After combining the property pages, the extended control returns the combined property pages to the container (step 812). After receiving the combined property pages, the container can then browse the property pages of both the extended control and the control, thereby making the extended control and the control appear to the container as being one object.

The IDispatch interface of the extended control can be utilized to access the properties or invoke the methods of either the extended control or the control.

Whenever a method is invoked or a property is accessed through the IDispatch interface, the signatures are the same. In providing this access, the IDispatch interface provides for both late bound access, as well as early bound access. The phrase "late bound access" refers to mapping the name of a method or property to an identifier of the method or property at run time. The phrase "early bound access" refers to the container having access to the identifier at compile time. Thus, for late bound access, the container utilizes the name of a particular property or method in order to receive the identifier ("DispID") of the property or method. In order to obtain the DispID for a given name, the container invokes the GetIDOfNames method of the IDispatch interface. After retrieving the DispID, the container can then utilize the invoke method of the IDispatch interface. The "invoke" method is utilized to invoke a method or provide access to a property when given a DispID. In utilizing the IDispatch interface for early bound access, the DispID must be known at compile time. This knowledge allows the invoke method to be executed without having to first utilize the GetIDOfNames method, which saves a significant amount of processing time. In this regard, the preferred architecture provides predefined DispIDs that are known at compile time so that the container can utilize early bound access. In order to prevent a collision between the use of two similar DispIDs, the preferred architecture of the present invention follows a particular convention. This convention reserves a particular range of negative DispIDs for the properties and methods of an extended control, whereas the properties and methods of the control utilize positive DispIDs. By utilizing this convention, collisions are avoided. Although one convention has been described, one skilled in the art will appreciate that other conventions can be used, such as delegating the properties and methods of the extended control to positive numbers and delegating the properties and methods of the control to negative numbers. In addition, one skilled in the art will appreciate that DispID collisions could be allowed by the present invention with the utilization of a disambiguation algorithm.

Figure 9:
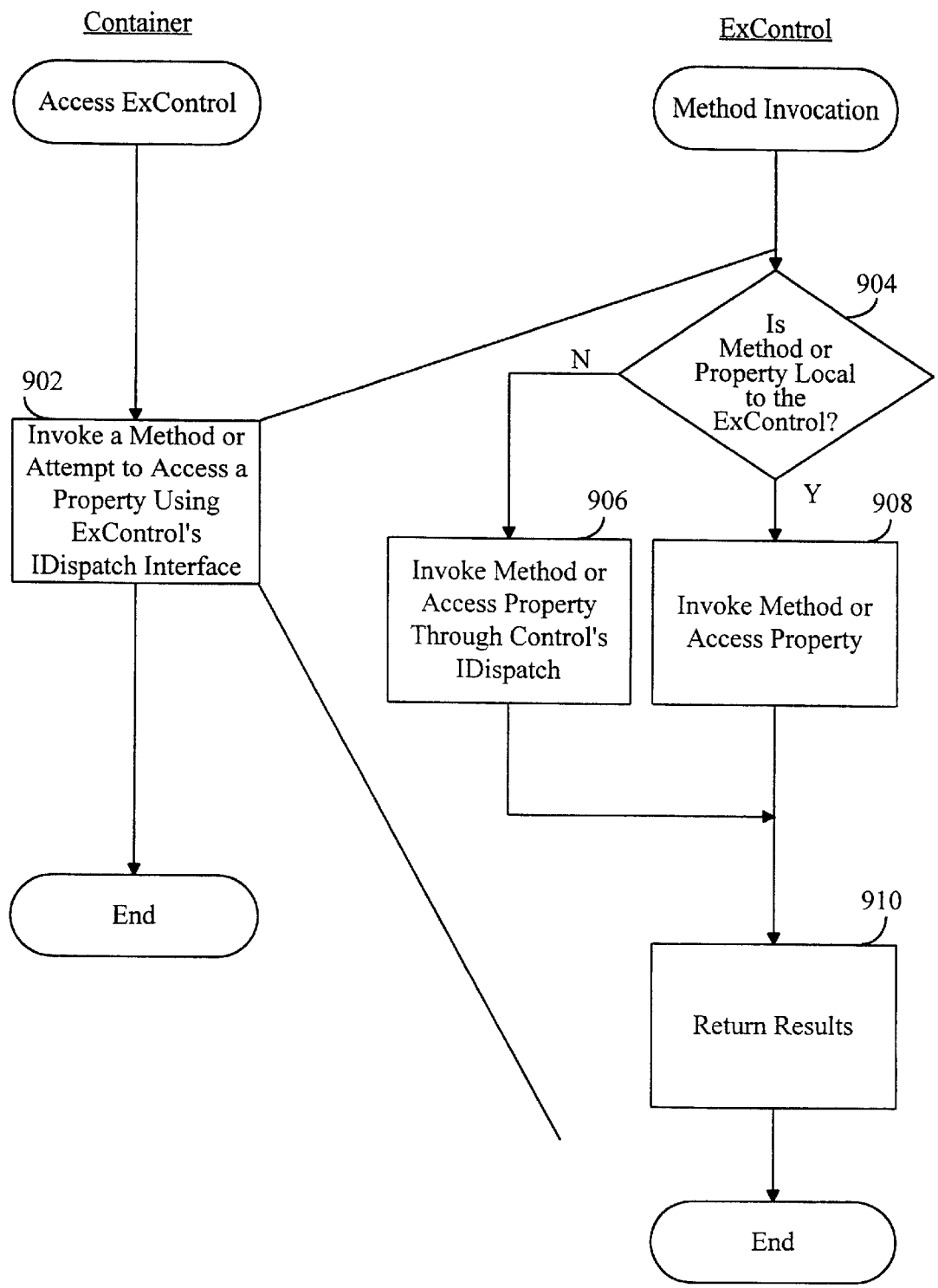
FIG. 9 depicts a flowchart of the steps performed by the preferred embodiment of the present invention when utilizing the IDispatch interface.

FIG. 9 depicts the processing performed when utilizing the IDispatch interface of the preferred architecture of the present invention. In utilizing the IDispatch interface of the extended control, the container first invokes a method or attempts to access a property using the IDispatch interface of the extended control (step 902). Upon invoking a method or accessing a property utilizing the IDispatch interface of the extended control, the extended control determines if the method or property is local to the extended control (step 904). The extended control stores its methods and properties locally (e.g. in local memory). Thus, the extended control can access its properties and methods directly (i.e., has local access) and, therefore, the extended control has sufficient knowledge to determine if the method or property is local. If the method or property is local to the extended control, the extended control invokes the method or accesses the property (step 908). If, however, the method or property is not local to the extended control, the extended control invokes the method or accesses the property through the IDispatch interface of the control (step 906). In this step, the extended control passes the received parameters, including the DispID, to the invoke method of the IDispatch interface of the control. In response to invoking the invoke method of the IDispatch interface of the control, the extended control will receive results from the invoke method. After either invoking the method or accessing the property of either the extended control or the control, the extended control returns the results to the container (step 910).

In order for a container to receive events, the container first utilizes the IConnectionPointContainer interface to receive a pointer to one or more IConnectionPoint interfaces. Each IConnectionPoint interface corresponds to a set of events ("a connection point") for which the container may register event handlers (i.e., methods) for invocation when the events occur. In the preferred architecture of the present invention, the extended control can be utilized to add additional connection points or add additional events on (i.e., augment) a particular connection point. In order to provide an additional connection point, the extended control must provide an implementation of the IConnectionPoint interface for the connection point. If the extended control wishes to add events to a connection point of the control, the extended control must provide an implementation of the IConnectionPoint interface which adds the additional events. If the container registers on such a connection point, when an event is generated by the extended control, the extended control sends the event to the container and when an event is generated by the control, the extended control acts as merely a passthrough mechanism. That is, the generated event is sent from the control through the extended control and to the container. In addition, instead of acting as a pass through mechanism, the extended control can also filter the events. When the extended control does not add any events to a connection point of the control, the extended control has the option of returning a pointer to the connection point of the control directly to the container or returning a pointer to an implementation provided by the extended control of the connection point of the control. If the extended control chooses to return a pointer to the connection point of the control directly to the container, the extended control will not act as a passthrough mechanism and the container will be notified directly from the control upon the generation of an event. This direct notification reduces processing time. However, if the extended control provides an implementation of the connection point provided by the control, the extended control can act as a passthrough or filter mechanism. Thus, by using the preferred architecture of the present invention, the extended control has flexibility in returning connection points.

Figure 10A:
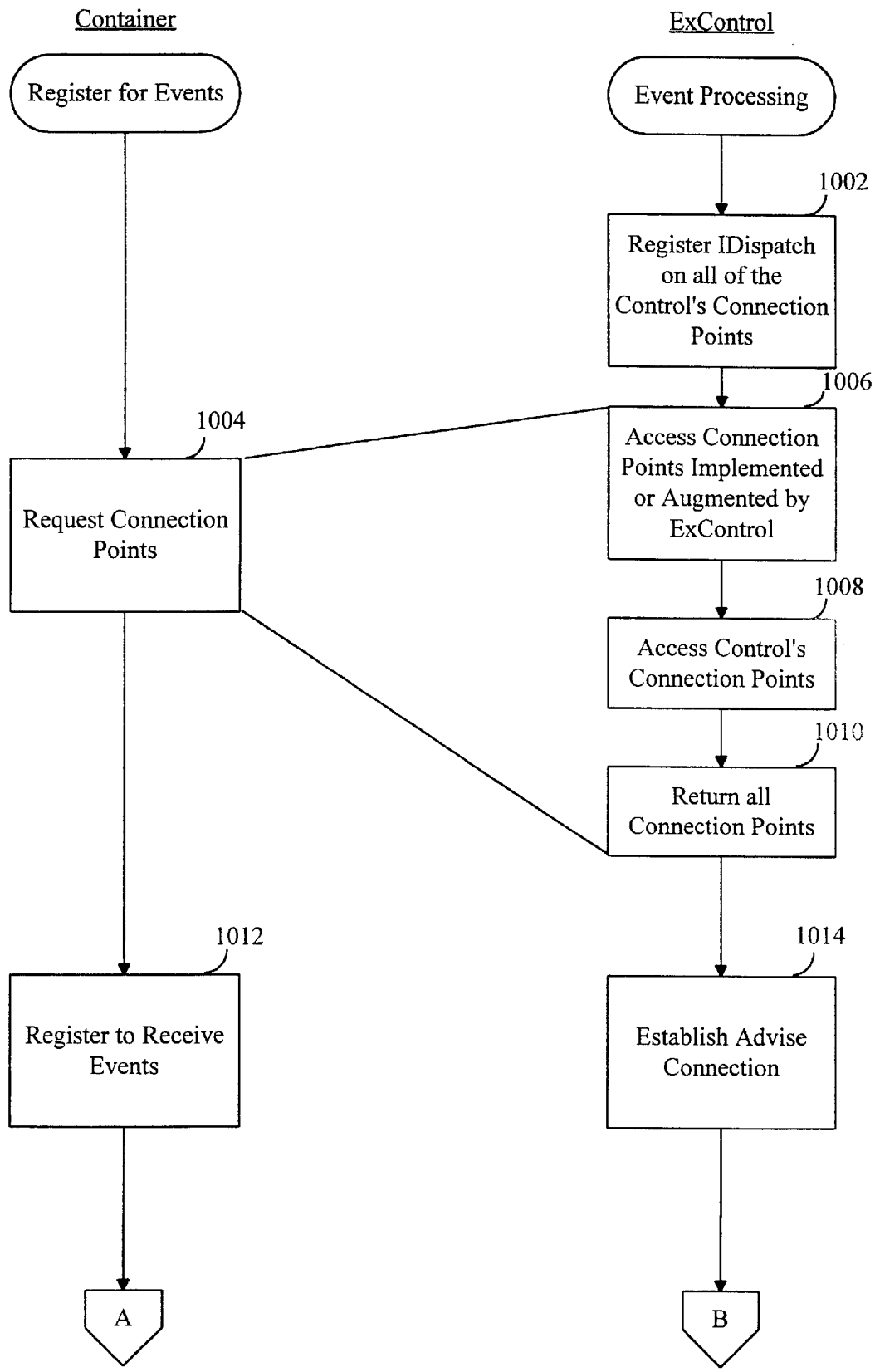
FIGS. 10A and 10B depict a flowchart of the steps performed by the preferred embodiment of the present invention for event processing.
Figure 10B:
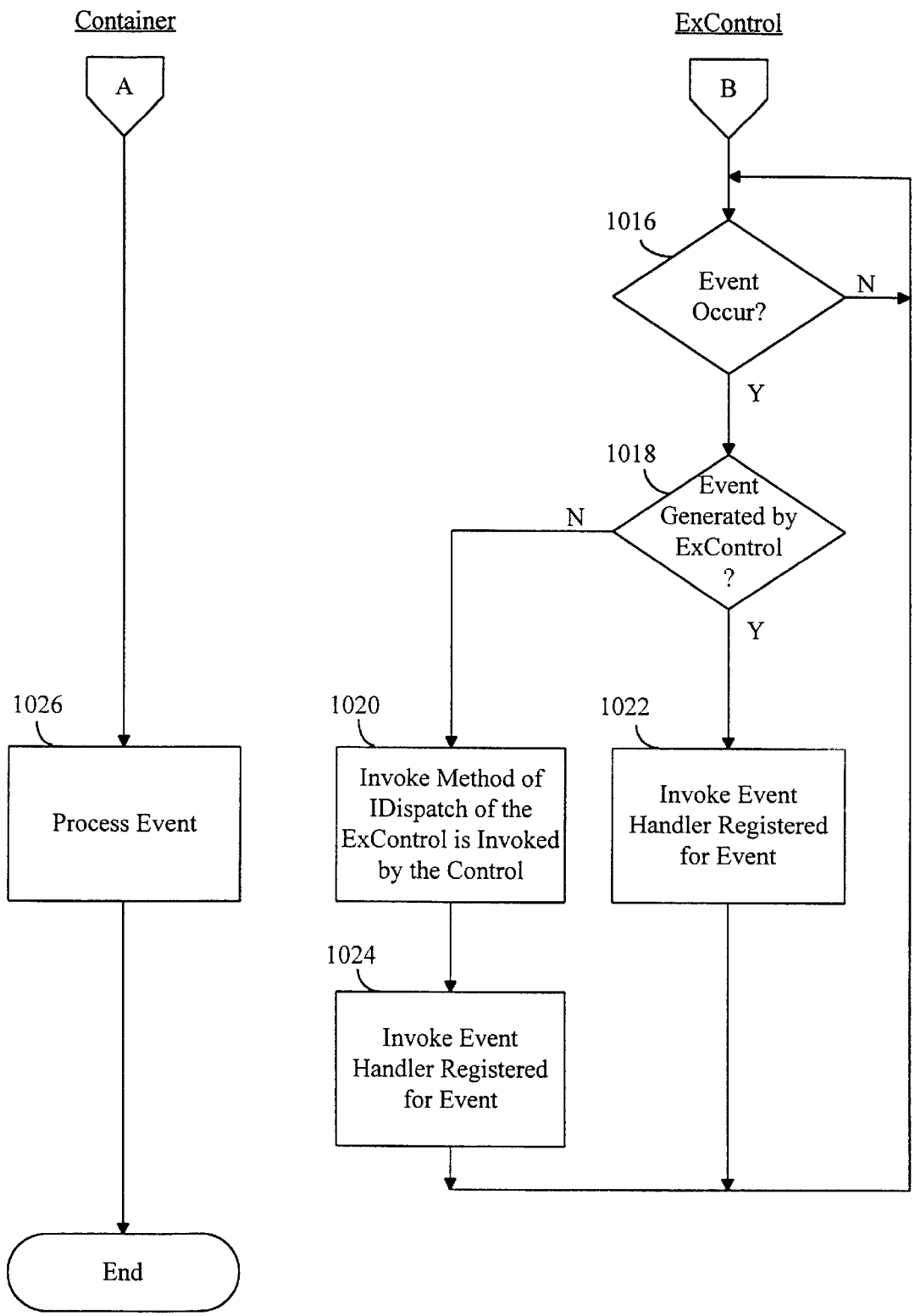

FIGS. 10A and 10B depict a flowchart of the steps performed during event processing. These figures describe both the registration of events, as well as the processing of an event. The first step performed in event processing is for the extended control to register an implementation of the IDispatch interface on all of the connection points of the control (step 1002). That is, a second implementation of the IDispatch interface is used for handling the events of the control. This step is performed so that the extended control receives all of the events of the control. The extended control determines all of the connection points of the control by invoking the EnumConnectionPoint method of the IConnectionPointContainer interface of the control. After receiving all of the IConnectionPoint interfaces, the extended control registers the second implementation of the IDispatch interface to be invoked upon the occurrence of each of the events on each of the connection points. This processing is made possible by the methods that can be invoked through the IDispatch interface having a common signature. After registering for all events of the control, sometime later, the container may request for one or more connection points of the extended control (step 1004). The container may make this request by utilizing the EnumConnectionPoints method on the IConnectionPointContainer interface to request all of the connection points of both the extended control, as well as the control. Alternatively, the container may invoke the FindConnectionPoint method of the IConnectionPointContainer interface to obtain a particular IConnectionPoint interface. The processing below will be described relative to an invocation of the EnumConnectionPoints method, however, one skilled in the art will appreciate that the present invention can be utilized with the invocation of the FindConnectionPoint method. For example, the FindConnectionPoint method may check locally for the requested connection point and if found, the connection point is returned to the container. However, if the connection point is not found locally, the container invokes the FindConnectionPoint method of the IConnectionPointContainer interface to retrieve the connection point from the control and then returns the connection point to the container.

After invoking the EnumConnectionPoints method, the extended control accesses the connection points implemented or augmented by the extended control (step 1006). The connection points that were implemented or augmented by the extended control are stored locally and therefore, the extended control has direct access to these connection points. After accessing the local connection points, the extended control accesses the connection points of the control (step 1008). The extended control accesses all of the connection points of the control by invoking the EnumConnectionPoints method of the IConnectionPointContainer interface of the control. Upon receiving the connection points of the control, the extended control returns both the local connection points and the connection points of the control to the container (step 1010). After receiving all of the connection points, the container registers to receive the events that are generated by one or more connection points (step 1012). In this step, the container registers event handlers to be invoked when an event is generated. In registering to receive events, the extended control establishes an advisory connection between the extended control and the container (step 1014). In this step, the extended control stores sufficient information locally so that the extended control can pass an event generated by the control to the container. Such information includes the event handler. This information is also sufficient for allowing the extended control to pass an event to the container when the extended control generates an event for which the container has registered. After registering to receive events, sometime later, the extended control determines if an event has occurred (step 1016 in FIG. 10B). The extended control waits until an event is generated and when an event has been generated, the extended control determines whether the event was generated by the extended control (step 1018). If the event was generated by the extended control, the extended control invokes the event handler that was registered for the event (step 1022). If, however, the event was generated by the control, the invoke method of the second implementation of the IDispatch interface is invoked by the control (step 1020). This step occurs because the second implementation of the IDispatch interface was registered to handle all events that were generated by the control. Next, the extended control invokes the event handler that was registered for the event (step 1024). Upon invoking the event handler that was registered for the event in either steps 1022 or 1024, the container processes the event (step 1026). This processing is typically performed by the event handler that was invoked.

While the present invention has been described with reference to a preferred embodiment thereof, those skilled in the art will know of various changes in form that may be made without departing from the spirit and scope of the claimed invention as defined in the appended claims.

What is claimed is:

1. A computer-readable medium containing a control comprising:
    a container-independent control component for providing container independent functionality to a container;
    a container-dependent control component for providing container dependent functionality of the container; and
    a receiving component that receives a request to perform functionality of the control, determines whether the request is to perform functionality provided by the container-independent control component or the container-dependent control component, and requests the determined control component to perform the requested functionality.

2. The computer-readable medium of claim 1, further comprising a site component for interfacing between the control and the container wherein the control invokes the functionality of the container through the site component and the container invokes the functionality of the control through the site component.

3. The computer-readable medium of claim 1 wherein the control provides functionality through a plurality of interfaces with each interface having a plurality of methods and properties.

4. The computer-readable medium of claim 1 wherein the container-dependent control component provides functionality through a plurality of interfaces with each interface having a plurality of methods and properties.

5. The computer-readable medium of claim 1 wherein the container-dependent control component has a dispatching component for early bound access and late bound access to the functionality of the container-independent control and the container-dependent control component.

6. The computer-readable medium of claim 1 wherein the container-dependent control component and the container-independent control have associated binding information, loading information and type information and wherein the container-dependent control component has a type library component for providing access to the binding information, the loading information and the type information of the container-dependent control component and the control.

7. The computer-readable medium of claim 1 wherein the container-dependent control component and the container-independent control component have groupings of properties comprising property pages, and wherein the container-dependent control component has a property page component for providing access to the property pages of the container-dependent control component and the container-independent control component.

8. The computer-readable medium of claim 1 wherein the container-dependent control component and the container-independent control component generate events, and wherein the container-dependent control component has an event component for providing access to the container for registering for the events generated by the container-dependent control component and the control.

9. The computer-readable medium of claim 8 wherein the event component includes a sending means for sending an event to the container when the container-dependent control component generates the event and for sending the event to the container when the container-independent control component generates the event.

10. A computer system comprising:
    a container-independent control component for providing container independent functionality to a container;
    a container-dependent control component for providing container dependent functionality of the container; and
    a receiving component that receives a request to perform functionality of the control, determines whether the request is to perform functionality provided by the container-independent control component or the container-dependent control component, and requests the determined control component to perform the requested functionality.

11. The computer system of claim 10, further comprising a site component for interfacing between the control and the container wherein the control invokes the functionality of the container through the site component and the container invokes the functionality of the control through the site component.

12. The computer system of claim 10 wherein the control provides functionality through a plurality of interfaces with each interface having a plurality of methods and properties.

13. The computer system of claim 10 wherein the container-dependent control component provides functionality through a plurality of interfaces with each interface having a plurality of methods and properties.

14. The computer system of claim 10 wherein the container-dependent control component has a dispatching component for early bound access and late bound access to the functionality of the container-independent control and the container-dependent control component.

15. The computer system of claim 10 wherein the container-dependent control component and the container-independent control have associated binding information, loading information and type information and wherein the container-dependent control component has a type library component for providing access to the binding information, the loading information and the type information of the container-dependent control component and the control.

16. The computer system of claim 10 wherein the container-dependent control component and the container-independent control component have groupings of properties comprising property pages, and wherein the container-dependent control component has a property page component for providing access to the property pages of the container-dependent control component and the container-independent control component.

17. The computer system of claim 10 wherein the container-dependent control component and the container-independent control component generate events, and wherein the container-dependent control component has an event component for providing access to the container for registering for the events generated by the container-dependent control component and the control.

18. The computer system of claim 17 wherein the event component includes a sending means for sending an event to the container when the container-dependent control component generates the event and for sending the event to the container when the container-independent control component generates the event.

* * * * *

UNITED STATES PATENT AND TRADEMARK OFFICE
CERTIFICATE OF CORRECTION

PATENT NO. : 6,067,578
DATED : May 23, 2000
INVENTOR(S) : Christopher A. Zimmerman, et al.

It is certified that error appears in the above-identified patent and that said Letters Patent is hereby corrected as shown below:

| Col./Line | Error Reads | Should Read |
|---|---|---|
| 1/54 | or | of |
| 4/4 | used represent | used to represent |
| 5/35 | | |
| 7/17 | 5,486,617 | 5,485,617 |

Signed and Sealed this

Twenty-second Day of May, 2001

Attest:

NICHOLAS P. GODICI

Attesting Officer    Acting Director of the United States Patent and Trademark Office